United States Patent
Such et al.

(10) Patent No.: US 6,894,281 B2
(45) Date of Patent: *May 17, 2005

(54) GRID FOR THE ABSORPTION OF X-RAYS

(75) Inventors: Olaf Such, Aachen (DE); Josef Lauter, Geilenkirchen (DE); Stefan Schneider, Aachen (DE); Herfried Wieczorek, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 460 days.

This patent is subject to a terminal disclaimer.

(21) Appl. No.: 09/726,783

(22) Filed: Nov. 30, 2000

(65) Prior Publication Data

US 2001/0011701 A1 Aug. 9, 2001

(30) Foreign Application Priority Data

Nov. 30, 1999 (DE) .......................................... 199 57 429
May 26, 2000 (DE) .......................................... 100 26 160

(51) Int. Cl.$^7$ .............................................. G01T 1/202
(52) U.S. Cl. ................................... 250/367; 250/363.1
(58) Field of Search .............................. 250/383, 374, 250/375, 367, 505.1, 503.1, 515.1, 363.1; 313/93; 378/134, 149

(56) References Cited

U.S. PATENT DOCUMENTS

| | | | |
|---|---|---|---|
| 4,485,307 A | * 11/1984 | Osborne et al. | 250/385.1 |
| 5,099,134 A |   3/1992 | Hase et al. | 250/505.1 |
| 5,814,235 A | *  9/1998 | Pellegrino et al. | 216/12 |
| 6,661,012 B2 | * 12/2003 | Wieczorek et al. | 250/367 |

* cited by examiner

*Primary Examiner*—John R. Lee
*Assistant Examiner*—David A. Vanore

(57) ABSTRACT

The invention relates to a grid (3) for the absorption of X-rays (11). An anti-scatter grid for reducing the scattered radiation is readily manufactured by arranging a plurality of layers containing wire elements (10) that are spaced apart and an appropriate ruggedness is achieved also for large-area X-ray detectors.

20 Claims, 2 Drawing Sheets

GRID FOR THE ABSORPTION OF X-RAYS

BACKGROUND OF THE INVENTION

The invention relates to a grid for the absorption of X-rays.

X-ray techniques utilize such grids as anti-scatter grids for the absorption of scattered radiation, arising in the tissue of the patient, before the characteristic X-ray signal caused by the different attenuation properties of the tissue examined is incident on the X-ray detector.

The radiation that is caused by the scattering of the X-ray photons in an object to be examined and cannot be used is shielded by shutters from the detector in order to reduce the scattered radiation component of the overall signal, so that scattered radiation that is incident at an angle is absorbed and does not reach the detector. Diaphragms of this kind are also referred to as anti-scatter grids or anti-scatter lamellae. For customary single line detectors the anti-scatter grids are usually constructed in the form of sheet metal lamellae.

The X-rays emitted by an X-ray source traverse the patient and are attenuated in conformity with the varying density and chemical composition of the tissue or bone to be examined. At the same time scattered radiation is added to the X-ray signal. In order to reduce such scattered radiation that falsifies the primary X-ray image to be formed, the X-rays are made to traverse an anti-scatter grid that is focused onto the focus of the radiation source. It is thus achieved that only the X-ray quanta that are characteristic of the attenuation of the irradiated object are detected.

U.S. Pat. No. 5,099,134 discloses a collimator (anti-scatter grid) and a method of constructing such a collimator. The collimator is formed by a frame which absorbs X-rays and includes an arrangement of first and second partition plates. The partition plates are provided with respective slits that extend in the longitudinal direction of the partition plate and enable the first partition plates to be inserted into the second partition plates at the corresponding angle. At its inner sides the rectangular frame is provided with slits for receiving the respective ends of the partition plates.

The manufacture of such two-dimensional anti-scatter grids is subject to given limits which are imposed by the complexity of the partition plates. The manufacture of anti-scatter grids of large dimensions, for example as used for large-area detectors, has been found to be difficult because bending of the large partition plates interferes with easy and correct engagement of the slits of the partition plates.

Large-area two-dimensional anti-scatter grids are used, for example, in multi-line CT (computed tomography) apparatus. The construction of CT examination apparatus is such that the radiation source is mounted so as to face the detector on a gantry which rotates about the patient while the patient is slowly displaced on a table. Vibrations of the gantry are transferred to the anti-scatter grid and the X-ray detector and have a negative effect on the image quality of the image to be formed. Such negative effects cannot be imitated, so that such effects falsifying the image can be reduced to a limited extent only during image processing at a later instant. The X-ray detector extends in two length dimensions, its dimension in the direction of the gantry being a number of times larger than its dimension in the direction of the longitudinal axis of the patient.

In order to enable fast X-ray operations, the width of the X-ray beam is increased. Consequently, a larger surface of the object to be examined, and hence also a larger volume, is scanned by means of a single scan. As a result, the scattered radiation component increases. In order to reduce such an increasing scattered radiation component, the height of the anti-scatter grid is increased. Known anti-scatter grids, however, do not have the ruggedness required for this purpose.

A further possibility for manufacturing two-dimensional anti-scatter grids with the necessary precision consists in the removal of material from a large block of material. Such manufacturing processes, however, are very expensive and not suitable for the production in large numbers.

OBJECT OF THE INVENTION

Therefore, it is an object of the invention to provide an anti-scatter grid for the reduction of the scattered radiation which can be realized by means of a simple manufacturing operation while ensuring a suitable ruggedness also in the case of large-area anti-scatter grids.

This object is achieved in that there are provided a plurality of layers which contain a plurality of wire elements that are spaced apart.

The wire elements have a selectable length which is defined by the dimensions of the X-ray detector. An appropriate number of such wire elements is arranged in a layer or ply at a selectable distance from one another. The distance between the wire elements is then defined by the resolution of the X-ray detector. The wire elements are arranged preferably parallel to one another in a layer. A plurality of such layers is arranged one above the other in such a manner that a weave-like grid is obtained. To this end, the orientation of successive layers is preferably rotated through a 90 degree angle so that when the distance between the wire elements of the layers is the same there is formed a square having a side length which corresponds to the distance between the wire elements. When a plurality of such layers is stacked, a spatial array is obtained with grid openings. The wire elements of different layers are oriented in the x, y direction in a three-dimensional co-ordinate system.

Anti-scatter grids are arranged in front of an X-ray detector so as to filter out scattered radiation that is not usable. X-ray detectors meanwhile have two-dimensional structures enabling a higher image quality and faster X-ray operations. Such X-ray detectors consist of a plurality of detector elements. The dimensions of such detector elements determine the distance between the wire elements in the individual layers. The grid openings of the anti-scatter grid are oriented in such a manner that the X-rays emitted by an X-ray source are incident at right angles to a plane of the anti-scatter grid which is formed by the upper layer. The incident X-rays are oriented approximately in the z direction in a three-dimensional co-ordinate system.

In a further embodiment the cross-section of the wire elements is advantageously round or polygonal with n corners. Because the scattered radiation component is absorbed by the wire elements, a special cross-section of the wire elements may be advantageous with respect to the reflection of the rays. Depending on the relevant method, a special cross-section of the wire elements may be easier to work during the manufacture of such a grid.

In a further embodiment the distance between individual wire elements in a layer is advantageously varied. X-ray detectors possibly have a varying resolution so that, for example, coarser resolution is possible in the edge zone of the X-ray detector and hence also in the edge zone of the anti-scatter grid. To this end, the distance between the wire elements in the edge zones of the individual layers should be larger than that in the central zone in which the resolution of the X-ray detector is highest.

The radiation source emits the X-rays with an appropriate focus. It has been found that the anti-scatter grid is advantageously oriented or focused relative to said focus. This necessitates variation of the spacing of the wire elements in the various layers. The spacing of the wire elements in the upper layers of the anti-scatter grid should thus be smaller than the spacing of the wire elements in the lower layers or levels of the anti-scatter grid. In this context the terms upper and lower refer to the incidence of the X-rays. This means that the layer closest to the radiation source has the smallest spacing of the wire elements and that the layer situated furthest from the radiation source or nearest to the X-ray detector has the largest spacing of the wire elements. Such a grid opening is then shaped as a truncated cone having a square base.

An arrangement of a plurality of successive layers with the same orientation of the wire elements offers the advantage that scattered radiation is absorbed for all angles of incidence. In the case of a uniformly composed anti-scatter grid, in which the orientation of the wire elements changes regularly, scattered radiation with a given angle of incidence can pass the anti-scatter grid through the gaps present between the wire elements of the individual layers. In the absence of a given regularity in the orientation of the anti-scatter grid, incidental passage of scattered radiation of a given angle of incidence is precluded.

It has been found that in a further embodiment the wire elements are advantageously made of a material absorbing X-rays or are enveloped with a material absorbing X-rays. Metals are particularly suitable in this respect, especially molybdenum or tungsten.

In order to ensure that the individual layers can be suitably stacked, it is advantageous to embed the wire elements in a synthetic material which is transparent to X-rays, so that each layer has flat surfaces. The thickness of the layers, however, should not exceed the diameter or the cross-sectional dimensions of the wire elements. The layers of wire elements can also be embedded in a liquid, X-ray transparent auxiliary substance without forming filled solid layers. The grid is removed from the auxiliary substance before it hardens. The wire elements are thus bonded together. It has been found that a round cross-section of the wire elements is particularly advantageous for such bonding of the wire elements, because the area of contact between the wire elements is particularly small so that a suitable bond can be established. When the wire elements are welded or soldered together, a square or polygonal cross-section may be advantageous, because more material and hence more surface is then available for bonding.

The high stability of the anti-scatter grid and its reduced tendency to oscillate are special advantages of the construction according to the invention. The flexibility in adapting the anti-scatter grid to the resolution of the X-ray detector is also found to be a major advantage over other scattered radiation absorbers. X-ray detectors for CT systems are curved. Because of its flexibility, an anti-scatter grid according to the invention can be suitably adapted to such curvature.

It has been found that the manufacture of an anti-scatter grid according to the invention is very simple and economical. X-ray absorbing wire is readily available and can also be readily treated. The wire elements can be very accurately arranged so as to form an anti-scatter grid according to the invention.

The object of the invention is also achieved by means of an X-ray examination apparatus provided with an anti-scatter grid with a plurality of layers in which wire elements extend parallel to one another, wire elements of different layers being arranged at an angle relative to one another and the anti-scatter grid being arranged in front of the X-ray detector.

BRIEF DESCRIPTION OF THE DRAWINGS

Embodiments of the invention will be described in detail hereinafter with reference to the drawing. Therein.

DESCRIPTION OF THE PREFERRED EMBODIMENTS

Figure 1:
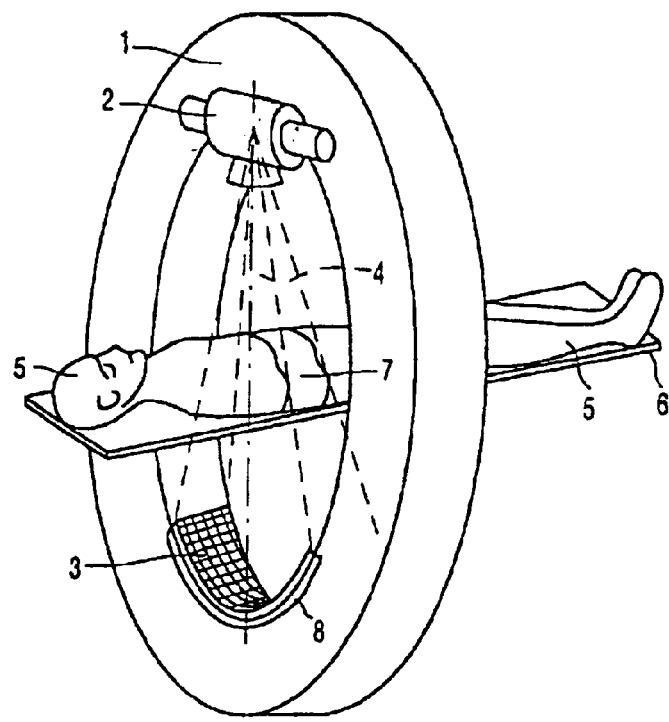
FIG. 1 shows a computed tomography apparatus with a grid arranged over the detector.

FIG. 1 shows a computed tomography apparatus with a gantry 1 on which a radiation source 2 is mounted. The X-ray detector 8 with the anti-scatter grid 3 arranged thereabove is mounted so as to face the radiation source 2. A patient 5 on a table top 6 is moved into the beam path 4. The gantry 1 rotates about the patient 5. An examination zone 7 is thus irradiated from all sides. The patient 5 is moved through the rotating gantry 1 in the horizontal direction or in the direction of the longitudinal axis of the patient, so that a volume image is formed by way of a plurality of cross-sectional images. In the case of two-dimensional X-ray detectors 8, the region scanned during one rotation is significantly larger than that scanned in the case of a single-line X-ray detector. This allows for faster displacement of the patient 5 through the gantry 1.

Figure 2:
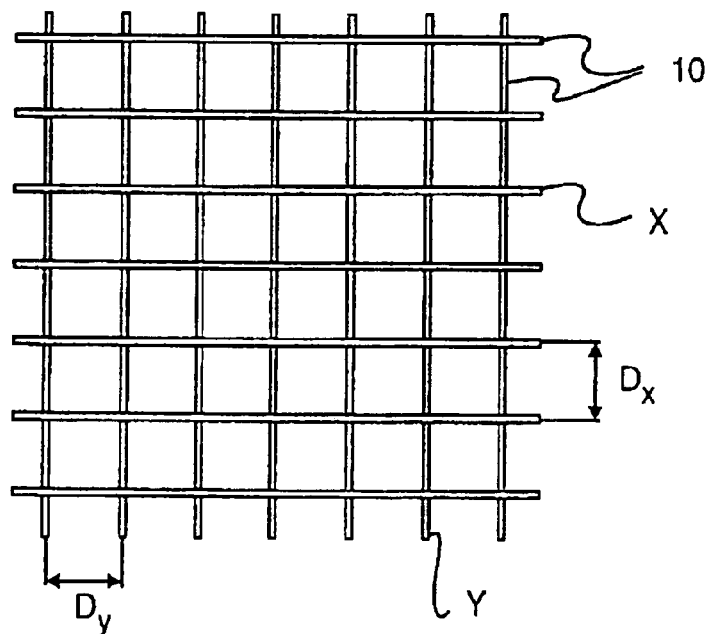
FIG. 2 is a plan view of two layers of wire elements.

FIG. 2 is a plan view of two layers of parallel arranged wire elements 10. The wire elements 10 of one layer are oriented in the X direction whereas the wire elements of the other layer are oriented in the Y-direction relative to a space co-ordinate system. The distance $D_X$ is the distance between the wire elements of the layer in which the wire elements are oriented in the X direction. The distance $D_Y$ denotes the distance between the wire elements of the layer in which the wire elements are oriented in the Y direction. The distances $D_X$ and $D_Y$ are equal in the present embodiment. The distances $D_X$ and $D_Y$ of the wire elements 10 result in grid openings. The X-rays enter the anti-scatter grid via said grid openings. Transversely moving X-ray photons are absorbed by the wire elements of the individual layers, so that exclusively X-ray photons that are characteristic of the X-ray image to be formed can reach the X-ray detector.

Figure 3:
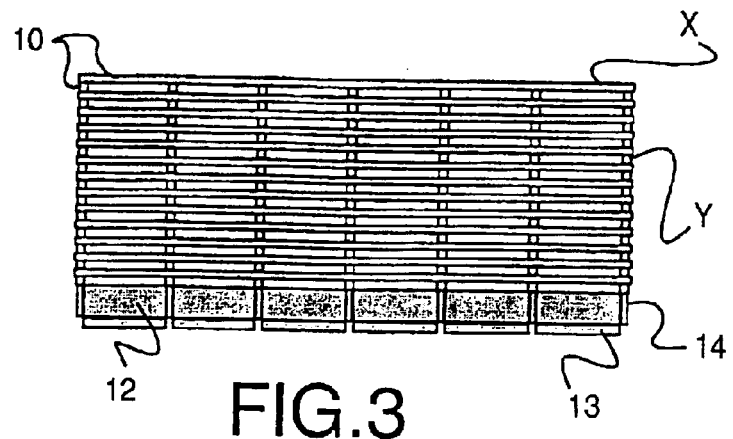
FIG. 3 is a side elevation of an anti-scatter grid.

FIG. 3 is a side elevation of a plurality of layers of wire elements which are oriented alternatively in the X direction and the Y direction. A web-like grid is formed by arranging a plurality of such layers one above the other. This grid is arranged over the X-ray detector consisting of scintillator elements 12, separating elements 14 and photosensors 13. The anti-scatter grid shown in FIG. 3 is not focused.

Figure 4:
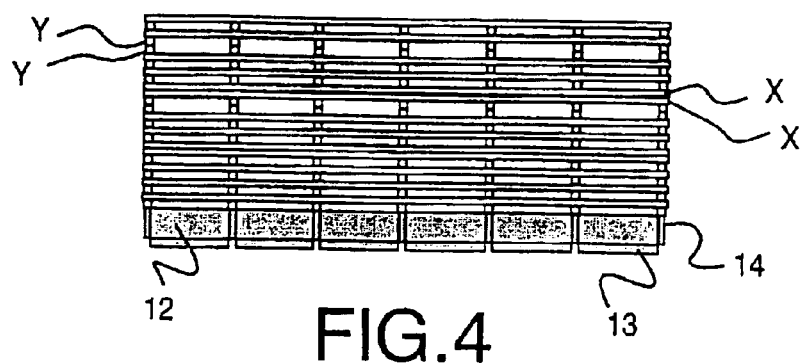
FIG. 4 is a side elevation of an anti-scatter grid with layers having a similar orientation.

FIG. 4 shows an anti-scatter grid in which a plurality of successive layers are oriented in a direction X or a direction Y. For special X-ray detectors such an arrangement may be advantageous in respect of stability. Moreover, absorption is ensured for all angles of incidence of the scattered radiation. In the case of a regular arrangement as shown in FIG. 2, there is exactly one angle of incidence for the scattered radiation for which no absorption occurs.

Figure 5:
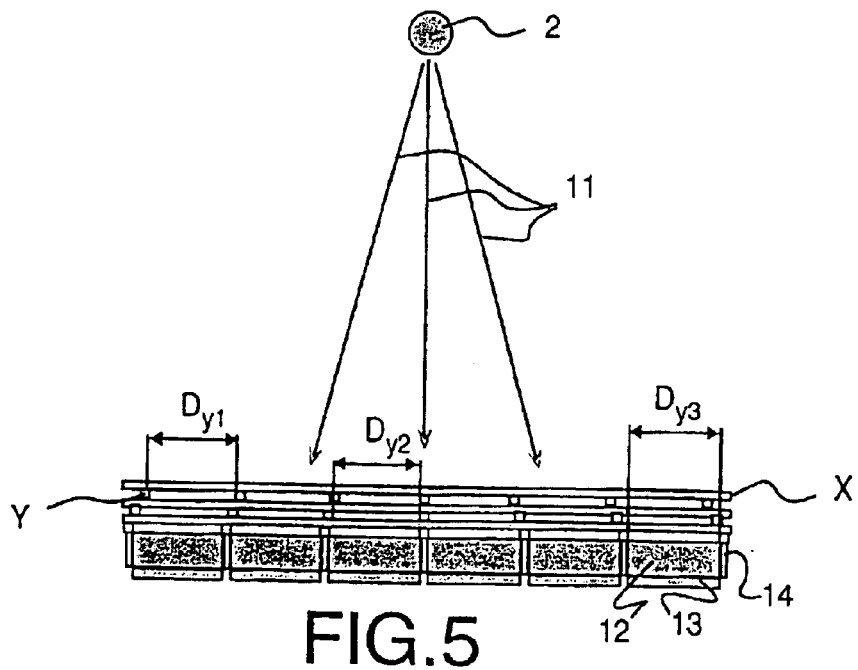
FIG. 5 is a side elevation of a focused anti-scatter grid.

FIG. 5 shows a focused anti-scatter grid in which the distance between the wire elements 10 differ. X-rays are emitted with a focus by the X-ray source 2 and travel at an angle as a fan beam away from said focus. In order to achieve effective filtering or an as good as possible primary radiation transparency, the anti-scatter grid is focused. The distance $D_{Y1}$ between the wire elements of the upper layer, being oriented in the Y direction, is the smallest. In the next layer, arranged therebelow, the distance $D_{Y2}$ between the wire elements is slightly larger. The distance $D_{Y3}$ between the wire elements in the lower layer is the largest. The radiation source 2 emits the X-rays 11 which are incident on the anti-scatter grid. The scattered radiation components are absorbed therein. The X-ray components, containing information that has not been falsified, can reach the relevant detector element without obstruction. The relevant detector element is then formed by the scintillator element 12 and the photosensor 13 arranged therebelow.

It is not problematic to realize focusing of the grid in one orientation only in special types of X-ray detector. The distance between the wire elements in the successive layers is then increased in one direction only from top to bottom. This means that, for example, the layer containing wire elements with the X orientation has a constant distance between the wire elements in all layers having the X orientation.

100 μm is a preferred cross-sectional dimension of the wire elements. The distance between the individual wire elements amounts to approximately 1.5 mm, so that a grid opening of 1.5 mm×1.5 mm is formed in a non-focused grid.

An anti-scatter grid for a curved X-ray detector is not explicitly shown.

Such a grid can be manufactured by means of numerous methods. The wire elements can be glued, welded or soldered to one another. The wire elements can be embedded in a synthetic material which is transparent to X-rays. The manufacture of layers in which the parallel wire elements are embedded in a synthetic material can also be realized. An arbitrarily large number of layers can thus be simply manufactured and the assembly of the layers for an anti-scatter grid is very flexible in respect of the number of layers.

The wire elements have a given flexibility so that the wire elements can also be woven. The crossing wire elements are then bent around one another at the cross-points.

Anti-scatter grids can also be provided with grid openings which are not rectangular. For X-ray detectors having n-angled detector elements, the relevant angular shape of the detector element can be imitated by varying orientations of the wire elements of individual layers.

For given fields of application anti-scatter grids can also be realized for electromagnetic radiation of a wavelength other than that of X-rays. When an anti-scatter grid according to the invention is also intended to absorb light in addition to the X-rays, the wire elements should be, for example, black in order to absorb also relevant light radiation in addition to the X-rays.

Anti-scatter grids having a fine-meshed resolution can also be realized for large-area flat X-ray detectors. The wire then has a cross-section of less than 1 mm and the distance between the wire elements is also less than 1 mm.

What is claimed is:

1. A grid for the absorption of X-rays comprising: a plurality of layers, at least one of the plurality of layers comprising at least two wire elements that are separate from each other and are spaced apart in the at least one of the plurality of layers, said grid being focused relative to an X-ray source for allowing the X-ray quanta emitted by the X-ray source that are characteristic of the attenuation of an irradiated object to pass therethrough and for absorbing scattered radiation.

2. A grid as in claim 1, wherein the at least two wire elements in said each one of the plurality of layers are arranged so as to extend parallel to one another.

3. A grid as in claim 1, wherein the at least two wire elements of a first one of the plurality of layers and a wire element of a second one of the other plurality of layers are arranged so as to extend at right angles to one another.

4. A grid as in claim 1, wherein the at least two wire elements comprise one of a round and a polygonal cross-sections.

5. A grid as in claim 1, wherein an adjacent pair of wire elements of the at least two wire elements in the at least one of the plurality of layers are spaced apart by a distance which differs from a distance between a different pair of the at least two wire elements in one of the at least one of the plurality of layers and another one of the plurality of layers.

6. A grid as in claim 1, wherein the at least two wire elements of a plurality of successive layers of the plurality of layers are oriented in one direction.

7. A grid as in claim 1, wherein the plurality of layers is focused onto a focus of the X-ray source.

8. A grid as in claim 1, wherein the at least two wire elements comprise one of a material which can absorb X-rays and a coating of material which can absorb X-rays.

9. A grid as in claim 1, wherein the plurality of layers is provided with an X-ray transparent auxiliary substance in order to secure the at least two wire elements.

10. An X-ray examination apparatus comprising:
an X-ray detector arranged and dimensioned for detecting X-ray quanta emitted by an X-ray source that are characteristic of the attenuation of an irradiated object; and
a grid for the absorption of X-rays arranged in front of the X-ray detector, the grid comprising a plurality of layers, at least one of the plurality of layers comprising a plurality of wire elements that are separate from each other and are spaced apart in the at least one of the plurality of layers, said grid being focused relative to the X-ray source for allowing the X-ray quanta emitted by the X-ray source that are characteristic of the attenuation of an irradiated object to pass therethrough to said X-ray detector and for absorbing scattered radiation.

11. An apparatus as in claim 10, wherein the at least two wire elements in said each one of the plurality of layers are arranged so as to extend parallel to one another.

12. An apparatus as in claim 10, wherein the at least two wire elements of a first one of the plurality of layers and a wire element of a second one of the other plurality of layers are arranged so as to extend at right angles to one another.

13. An apparatus as in claim 10, wherein the at least two wire elements comprise one of a round and a polygonal cross-sections.

14. An apparatus as in claim 10, wherein an adjacent pair of wire elements of the at least two wire elements in the at least one of the plurality of layers are spaced apart by a distance which differs from a distance between a different pair of the at least two wire elements in one of the at least one of the plurality of layers and another one of the plurality of layers.

15. An apparatus as in claim 10, wherein the at least two wire elements of a plurality of successive layers of the plurality of layers are oriented in one direction.

16. An apparatus as in claim 10, wherein the plurality of layers is focused onto a focus of the X-ray source.

17. An apparatus as in claim 10, wherein the at least two wire elements comprise one of a material which can absorb X-rays and a coating of material which can absorb X-rays.

18. An apparatus as in claim 10, wherein the plurality of layers is provided with an X-ray transparent auxiliary substance in order to secure the at least two wire elements.

19. A grid as in claim 1, wherein each of the plurality of layers includes a plurality of parallel wire elements, wherein the plurality of layers includes an upper layer and a lower layer, the parallel wire elements of the upper and lower layers extending in the same direction, wherein adjacent ones of the parallel wire elements of the upper layer are spaced apart by a first distance, and adjacent ones of the parallel wires elements of the lower layer are spaced apart by a second distance, the first distance being different than the second distance.

20. An apparatus as in claim 10, wherein each of the plurality of layers includes a plurality of parallel wire elements, wherein the plurality of layers includes an upper layer and a lower layer, the parallel wire elements of the upper and lower layers extending in the same direction, wherein adjacent ones of the parallel wire elements of the upper layer are spaced apart by a first distance, and adjacent ones of the parallel wires elements of the lower layer are spaced apart by a second distance, the first distance being different than the second distance.

* * * * *